United States Patent
Birzer et al.

(10) Patent No.: US 7,363,527 B2
(45) Date of Patent: Apr. 22, 2008

(54) ERROR TOLERANT AUTOMATION SYSTEM AND METHOD FOR ERROR HANDLING IN A REAL-TIME AUTOMATION SYSTEM

(75) Inventors: Johannes Birzer, Stulln (DE); Raimund Kram, Erlangen (DE); Wolfgang Horn, Hohenstein-Emstthal (DE)

(73) Assignee: Siemens Aktiengesellschaft, Munich (DE)

( * ) Notice: Subject to any disclaimer, the term of this patent is extended or adjusted under 35 U.S.C. 154(b) by 692 days.

(21) Appl. No.: 10/500,232

(22) PCT Filed: Dec. 23, 2002

(86) PCT No.: PCT/DE02/04711

§ 371 (c)(1),
(2), (4) Date: Jun. 25, 2004

(87) PCT Pub. No.: WO03/056428

PCT Pub. Date: Jul. 10, 2003

(65) Prior Publication Data

US 2005/0081120 A1    Apr. 14, 2005

(30) Foreign Application Priority Data

Dec. 28, 2001   (DE) ............................... 101 64 495

(51) Int. Cl.
*G06F 11/00* (2006.01)

(52) U.S. Cl. .......................................... 714/2; 700/79

(58) Field of Classification Search .................. 714/2, 714/32, 37, 48; 700/79
See application file for complete search history.

(56) References Cited

U.S. PATENT DOCUMENTS

| | | | | |
|---|---|---|---|---|
| 5,592,373 | A | * | 1/1997 | Barthel et al. ................. 700/79 |
| 6,973,643 | B2 | * | 12/2005 | Goldsmith et al. ......... 717/124 |
| 2003/0037291 | A1 | * | 2/2003 | Goldsmith et al. ........... 714/38 |
| 2003/0061007 | A1 | * | 3/2003 | Sigl ........................... 702/185 |

OTHER PUBLICATIONS

David B. Stewart et al.; The Chimera II Real-Time Operating System for Advanced Sensor-Based Control Applications; IEEE Transactions on Systems, Man, and Cybernetics; Nov./Dec. 1992; USA; vol. 22, No. 6.
David B. Stewart et al.; Dynamically Reconfigurable Embedded Software—Does it Make Sense?; Engineering of complex Computer Systems; Proceedings; Second IEEE International Conference in Montreal, Quebec-Canada; Oct. 21-25, 1996; p. 217-220.
A. Terrasa et al.; Including User-Defined Timing Exception Support in FRTL; Proceedings; Seventh International Conference on Real-Time Computing Systems and Applications; Dec. 12-14, 2000; p. 255-262.

* cited by examiner

*Primary Examiner*—Nadeem Iqbal
(74) *Attorney, Agent, or Firm*—Scott T. Weingaertner; King & Spalding

(57) ABSTRACT

The invention relates to an automation system, wherein error reaction is improved. This is achieved by providing a method for the treatment of errors in a real time automation system, wherein at least one error reaction function is triggered by at least one processing error and/or access error. The improvement is achieved by providing a method for the treatment of errors using the error reaction function, and by providing a method for the treatment of errors in an automation system which has at least two levels of execution, wherein at least one error reaction function is triggered by at least one processing error and/or one access error on at least one of the other levels of execution.

24 Claims, 2 Drawing Sheets

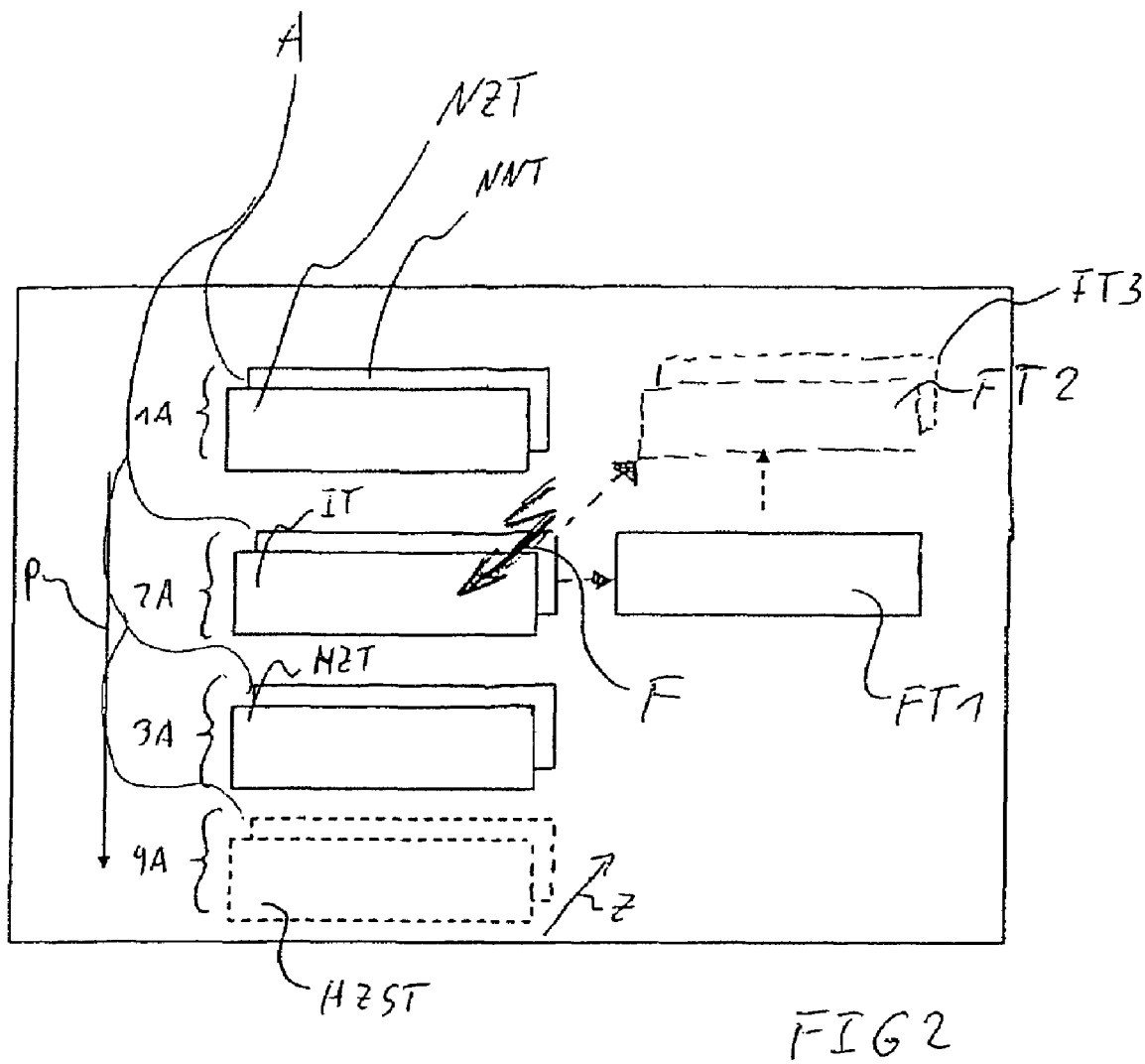

ERROR TOLERANT AUTOMATION SYSTEM AND METHOD FOR ERROR HANDLING IN A REAL-TIME AUTOMATION SYSTEM

FIELD OF THE INVENTION

The invention lies in the field of automation controllers or automation systems. Automation systems or controllers are used in particular in the case of production machines, machine tools, manipulators, industrial processes and/or in industrial production operations.

BACKGROUND OF THE INVENTION

Automation systems have to meet a wide variety of requirements, such as, flexible, reliable, and/or consistent reactions to events, for example:

processing errors in a user program, such as for example division by zero and/or infringement of array limits access errors in the case of I/O variables—input/output variables access errors when reading and/or writing system variables These requirements apply in particular to a freely programmable automation system or controller. If the automation controller or the automation system (the terms controller and automation system may be accepted as synonyms to each other although the automation system may also include an automation controller) have multitasking properties, the requirements become more rigorous. This applies, for example, to a freely programmable automation system for a production machine, such as for example, a printing machine or a plastics injection-molding machine with multitasking properties, which on account of integrated technology and automatic control functionality has to conform to hard real-time properties. Real-time properties are also required, for example, in the case of a machine tool, such as for example a lathe, a grinding machine, a milling machine, etc., or in the case of one or more manipulators operating together.

The automation controller or the automation system has software, with tasks, i.e. functions, or programs, or jobs being started and processed, or capable of being processed, in this software. In an automation controller or in an automation system, the requirements described above have previously been met by means of synchronous exceptions, in particular whenever near real-time requirements have to be satisfied. With the synchronous exception, at least one user program is immediately started, as a reaction to an error, with the same priority as the processed task in which an error has occurred.

A disadvantage of this solution is that the solution with synchronous exceptions can only be used to a restricted extent in an automation system or in an automation controller with high-priority cyclical tasks, since the total running time of the high-priority cyclical task levels is limited. If this limitation is exceeded, the real-time property is lost. If synchronous exceptions are used, a real-time automation system cannot be realized, since real time is not guaranteed in every case. This problem also generally occurs in the case of other real-time systems in which high-priority tasks are to be processed in a maximum total running time which is necessary for processing.

SUMMARY OF THE INVENTION

The invention is based on the object of improving the reaction to errors which occur in the software (for example division by zero or infringement of array limits) and/or hardware (for example access errors in the case of I/O variables) of an automation controller or an automation system. Automation systems or controllers are used in particular in the case of production machines, machine tools, manipulators, industrial processes and/or in industrial production operations.

This object is achieved according to the invention by a method for error handling in an automation system, which is, for example, an automation controller, in which at least one error reaction function is triggered by at least one processing error and/or at least one access error, the error reaction function being at least parameterizable and/or programmable.

The parameterizability and/or programmability of an error reaction function makes it possible to form the error reaction function in such a way that the real-time properties of an automation system are retained even in the event of an error. A wide variety of requirements have to be met by automation systems, in particular real-time automation systems. These are, for example, flexible, reliable, and/or consistent reactions to:

processing errors in the user program, for example division by zero, infringement of array limits, access errors in the case of I/O variables—input/output variables, access errors when reading and writing system variables.

These requirements are to be met in particular in the case of a freely programmable automation system for a production machine with multitasking properties, since, for example, on account of integrated technology and automatic control functionality, it has to conform to hard real-time properties. A hard real-time property means that the real-time property is retained even in the event of an error. In the case of automation systems without hard real time (i.e. in the event of an error for example, they no longer have the real-time property), the handling of an error that has occurred has previously been achieved by means of synchronous exceptions, which are user programs which are started immediately with the same priority as the processed task/function in which an error occurs.

If the automation system, i.e. the automation controller, has various execution levels, these have, for example, different priorities. Programs, functions, tasks, or jobs can be processed on various execution levels. If an error occurs in a program, a job, a function, or the like on one execution level, an error reaction function can be executed, but may influence programs or functions on the execution levels in the timing with which they are processed, in such a way that a required processing time of another program or a function can no longer be ensured.

An improved error reaction can also be achieved according to the invention in that, for error handling in the case of an automation system which has at least two execution levels, in which at least one processing error and/or access error on one execution level causes at least one error reaction function to be triggered on at least one of the further execution levels.

The fact that a further execution level, which has a different priority than the original execution level, is used for an error reaction function makes it possible to influence the time sequence of programs or functions. The choice of the execution level for the error reaction function is advantageously programmable or parameterizable.

In an advantageous refinement of the method for error handling, the error reaction function is respectively handled on the further execution level, which has lower priority than the respective execution level on which the processing error and/or the access error occurred. This has the advantage that the time sequence in which the error has occurred remains substantially uninfluenced by the error. Under some circumstances, however, a simple time-uncritical command, such as the adoption of a last permissible value may, for example, be carried out when an impermissible value occurs.

An error reaction function can also be triggered by the processing error and/or the access error on the same execution level as the processing error and/or access error, or is triggered there, a further error reaction function being triggered on at least one execution level of lower priority.

In this way, firstly, reliable further processing of the program or the function in which the error has occurred is ensured without problems arising, for example, with respect to the meeting of real-time requirements. Error handling that is no longer as time-critical then takes place by the error reaction function started on an execution level of lower priority.

The implementation of a method for error handling in the case of an automation system, i.e. in the case of an automation controller, which is used as a real-time automation system is particularly advantageous.

The method for error handling according to the invention is consequently used advantageously in the case of real-time requirements and also satisfies these requirements. This applies in particular to an automation system with high-priority cyclical tasks, the control quality remaining ensured. High requirements for control quality and dynamics of an automation system are still met. In an advantageous refinement, the error reaction function is parameterized and/or programmed before it is triggered.

The requirement for a flexible, reliable, and/or consistent reaction to errors is made possible according to the invention by a thorough consistent overall approach to error handling by means of the definition/realization of:
  access functions and/or
  a defined configurable execution behavior in the event of access errors when the access function is not applied and/or
  a defined behavior when processing errors occur in a user program.

In the definition or realization of access functions, access errors can be corrected by means of parameterizable access functions, the possibility of producing a predefined behavior in the event of an error advantageously existing. Examples of this are the adoption of a projected substitute value, the adoption of the last value and/or also the use of a limit value. The behavior of the access function on the basis of parameters can be set before it is called up or immediately when it is called up. The fixing of a predefined behavior in the event of an error of an access function is an error reaction function. The execution of the access function in the event of an access error does not necessarily mean the starting of an error processing task, i.e. an error reaction function that is synonymous, but an error reaction function can be executed. The access function can advantageously be used in various types of task, preferably every type of task.

When an error occurs for example during access to an internal or external value and non-application of the access function, a defined configurable execution behavior can advantageously be realized when there is at least one access error. If an access error occurs without an access function being used, a configured behavior is executed by the automation system or the automation controller, such as, the adoption of the substitute value, the adoption of the last value, or the starting of an error processing task in which the reaction can be flexibly eliminated by programming.

If a processing error occurs in a user program, a defined behavior, which can be set, with respect to the processing error is made possible according to the invention. The following possibilities are obtained for example for this:
  starting of the error processing task, i.e. the error reaction function, in the event of a processing error in the user program;
  or direct switching of the automation system into the stop state.

The error processing task, i.e. the error reaction function, has in this case, for example, one of the following properties:
  a user program for reaction to the processing error or access error can be included in the error processing task/error reaction function;
  the error processing task/error reaction function is informed of task starting information, in which task the error has occurred, and of which type the access error or the processing error is;
  the error processing task/error reaction function has a defined priority in the execution system, which does not hinder high-priority cyclical tasks, for example, of motion control in the automation system. The priority of the error processing task is in this case optionally fixed, or else can be set, but below the priority level of the high-priority cyclical tasks for motion control, and/or, for example, some other kind of control;
  the start of the error processing task/error reaction function leads to stopping and abnormal termination of the task in the user program of which the error has occurred;
  non-cyclical tasks can be restarted by means of programming in the error processing task/error reaction function.

Consequently, consistent system and execution behavior can be achieved even in hard real-time systems.

Access errors can be corrected directly in flexible parameterizable access functions by the configuration according to the invention of an automation system. Reactions to access errors and processing errors can also be programmed in an error reaction function, the error reaction function being started in the event of an error. The error handling according to the invention advantageously does not involve abnormal termination or influencing of high-priority cyclical system tasks, as occur for example in the case of motion control tasks. Such tasks are, for example, interpolation and/or automatic control.

With the aid of the error handling according to the invention, reliable system behavior of the automation system can be achieved even in such a way that it is possible to end the task in which an error has occurred. In an advantageous way, non-cyclical tasks can be newly set up, i.e. can be started. When newly setting up non-cyclical tasks, either the starting values of the original task or else interim results of the aborted task are used.

The error handling according to the invention advantageously involves controlled shutting down, i.e. running down or stopping, of the system where at least one error occurs in a cyclical task, since repeated processing and/or abnormal termination of the cyclical task is not necessarily appropriate in this case. Consistent system behavior is advantageously achieved according to the invention even when the system does not stop.

In an advantageous way, according to the invention, the maximum permissible total running time of a high-priority cyclical task is not exceeded, in order to ensure agreed closed-loop and/or open-loop control quality. This applies, in particular, to the case of automation controllers and/or automation systems, where it may be possible for these terms to be used synonymously, with hard real-time requirements.

The automation system according to the invention is advantageously used in the case of a production machine and/or a machine tool.

Further advantageous configurations and a use and/or device for the invention can be taken from claims 1 to 15.

BRIEF DESCRIPTION OF THE DRAWINGS

Exemplary embodiments of the invention are represented in the figures.

FIG. 2 shows error reaction functions distributed on execution levels.

DETAILED DESCRIPTIONS OF THE INVENTION

Figure 1:
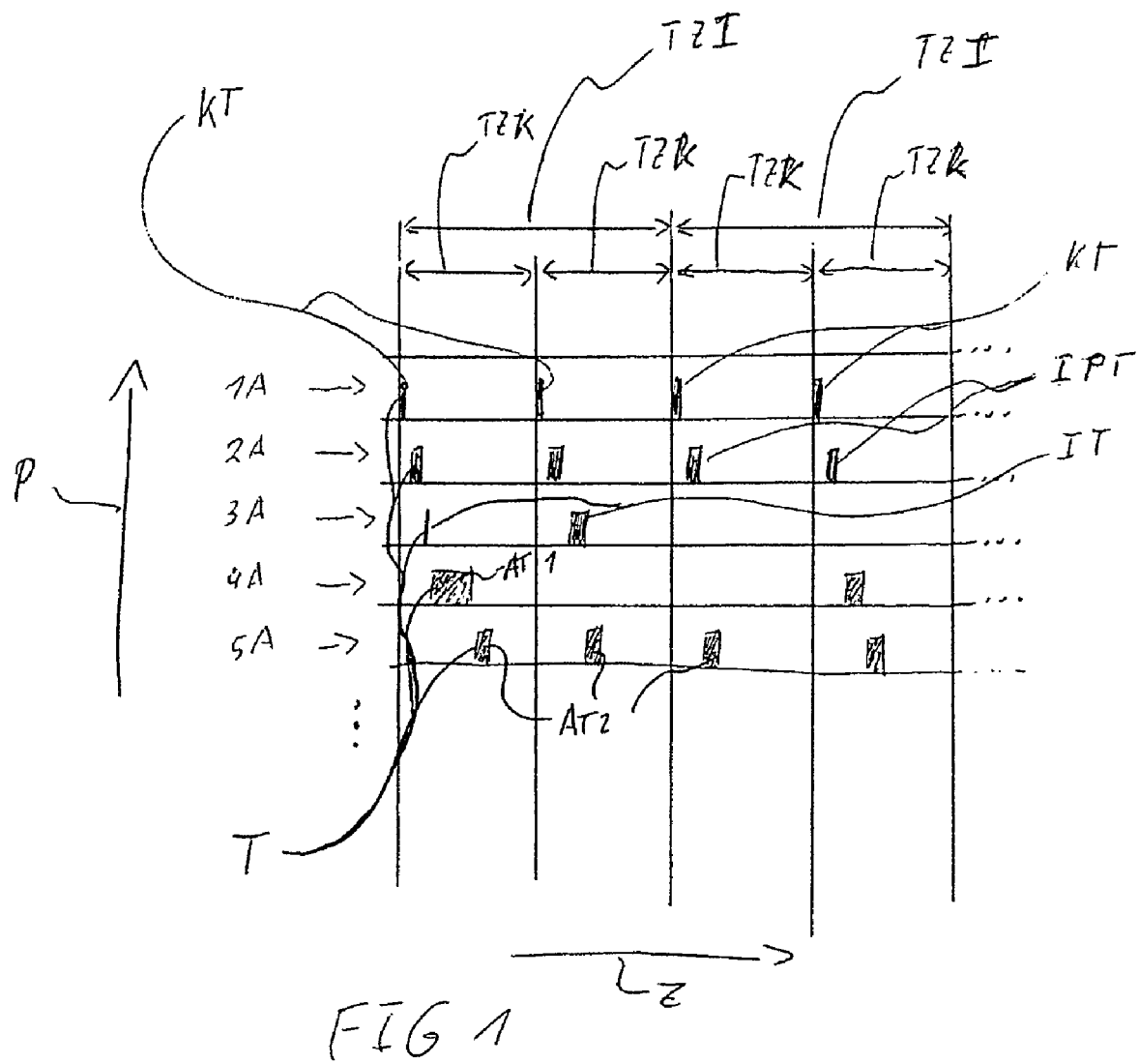
FIG. 1 shows different execution levels for the execution of software in an automation system.

In accordance with an aspect of the present invention, FIG. 1 shows five different execution levels 1A, 2A, 3A, 4A and 5A for the execution of software of an automation system. A priority P—represented as an arrow in FIG. 1—rises from the execution level 5A to the execution level 1A. The tasks T to be processed are represented on the execution levels 1A to 5A as bars and plotted with respect to a time access Z. High-priority functions, i.e. tasks such as for example communication tasks KT, are executed on the execution level 1A. The communication tasks KT are repeated cyclically in a clock cycle TZK for the communication. In a further clock cycle TZI, processing takes place, for example, for an interpolation of a machine tool or a production machine. The function for the interpolation is executed in the interpolation task, the execution taking place on an execution level 2A of lower priority than that of execution level 1A. The execution level 3A is allocated interrupt tasks IT. User tasks AT1, AT2 are assigned in a way corresponding to their importance to the execution levels 4A and 5A.

The representation according to FIG. 2 shows by way of example various tasks NZT, NNT, IT, HZT, HZST and FT, which are executable in an automation system. The term task can in this case be used for example in the sense of the term function, the function comprising at least one task. A function can, however, also be divided into various tasks. In FIG. 2, the following tasks are executed, these tasks having different priorities:
low-priority cyclical task NZT
non-cyclical tasks NNT
error processing tasks FT1, FT2, FT3
interrupt tasks IT
high-priority cyclical tasks HZT
high-priority cyclical system tasks HZST.

The error processing task corresponds to an error reaction function. The tasks NZT, NNT, IT, HZT, HZST and FT are allocated to execution levels A, the execution levels A having different priorities P with respect to processing and being divided into the execution levels 1A, 2A, 3A and 4A. The priority P, which is represented as a downwardly pointing arrow, increases in the direction of the arrow. The tasks are represented by rectangular boxes, each box being assigned at least one task. The time sequence of the tasks NZT, NNT, IT, HZT, HZST and FT1/2/3 is given by the perspective representation with reference to a time axis Z represented as an arrow.

The error processing tasks FT1, FT2, FT3 are assigned to different execution levels 1A and 2A, on the basis of priority. Provided along with them on the corresponding execution levels A are also the interrupt tasks IT, and/or the low-priority cyclical tasks NZT, and/or the low-priority non-cyclical tasks NNT.

In the case of the following tasks: low-priority cyclical task NZT, low-priority non-cyclical task NNT, interrupt task IT, high-priority cyclical task HZT and the error processing task, access functions can be used in all the user tasks.

If, for example, an error F occurs on the execution level 2A of the interrupt task IT, an error processing task FT1 can be started on the same execution level 2A. However, an error processing task FT2 or FT3 can also be started on a lower-priority execution level 1A. The starting of a lower-priority error processing task FT2, FT3 may also take place by another error processing task FT1. The execution of error processing tasks FT1, FT2, i.e. of error reaction functions, on a low-priority execution level saves computing time of a computer for higher-priority tasks. Consequently, a real-time automation system can be realized. This also satisfies hard real-time requirements, in particular in the case of an error.

The invention claimed is:

1. A method for error handling in a real-time automation system having at least two execution levels, the at least two execution levels comprising different priority levels, the method comprising the step of triggering at least one error reaction function in response to at least one of the group consisting of at least one processing error and at least one access error occurring on one of the at least two execution levels, wherein a first error reaction function is triggered by either or both of the at least one processing error and the at least one access error on the same execution level as either or both of the at least one processing error and the at least one access error and wherein a second error reaction function is triggered on one of the at least two execution levels of a lower priority.

2. The method according to claim 1, wherein the at least one error reaction function is parameterized before triggering.

3. The method according to claim 1, wherein the at least one error reaction function is programmed before triggering.

4. The method according to claim 1, wherein the real-time automation system executes high-priority cyclical system functions, whereby the high-priority cyclical system functions are executed without being influenced by the at least one error reaction function.

5. The method according to claim 1, wherein high-priority cyclical system functions are continued without being aborted when an error reaction function is executed.

6. The method according to claim 1, wherein functions that comprise an error are aborted, whereby reliable behavior of the automation system is ensured.

7. The method according to claim 1, wherein the real-time automation system executes non-cyclical functions, the non-cyclical functions that comprise an error are aborted, and aborted non-cyclical functions are restarted, taking a respectively preceding terminated non-cyclical function as a basis.

8. The method according to claim 1, wherein in the event of an occurrence of errors in cyclical functions, the automation system is stopped.

9. The method according to claim 1, wherein in the event of an occurrence of errors due to the automation system, a consistent system behavior is produced without stopping the automation system.

10. The method according to claim 1, wherein the real-time automation system comprises at least one of the group consisting of a machine tool and a production machine.

11. A real-time automation system capable of running a plurality of tasks having different priority levels, the automation system comprising:
a plurality of execution levels each comprising a different priority level, wherein the plurality of tasks are assigned to the plurality of execution levels based on the priority level associated with each of the plurality of tasks; and
at least one error reaction function for handling an occurrence of at least one of the group consisting of at least one processing error and at least one access error in one of the plurality of tasks assigned to one of the plurality of execution levels, wherein a first error reaction function is executed on the same execution level as the one of the plurality of tasks in which either or both of the at least one processing error and the at least one access error has occurred and wherein a second error reaction function is executed on one of the plurality of execution levels comprising a lower priority than the one of the plurality of tasks in which either or both of the at least one processing error and the at least one access error has occurred.

12. The system according to claim 11, wherein one of the plurality of tasks comprises a high priority task that is not terminated during the occurrence of the at least one of the group consisting of at least one processing error and at least one access error in one of the plurality of tasks assigned to one of the plurality of execution levels.

13. The system according to claim 11, wherein the real-time automation system comprises at least one of the group consisting of a machine tool, a production machine and a motion controller.

14. The system according to claim 11, wherein the at least one error reaction function comprises at least one error processing task comprising a plurality of properties.

15. The system according to claim 14, wherein the plurality of properties comprises a user program for responding to the occurrence of the at least one of the group consisting of at least one processing error and at least one access error, wherein the user program is included in the at least one error reaction function.

16. The system according to claim 12, wherein the plurality of tasks comprise at least one of the group consisting of non-cyclical tasks, interrupt tasks, and low priority cyclical tasks.

17. The system according to claim 12, wherein the high priority task comprises one of the group consisting of a high-priority cyclical task and a high-priority cyclical system task.

18. The system according to claim 11, wherein the at least one error reaction function is parameterized before execution.

19. The system according to claim 11, wherein the at least one error reaction function is programmed before execution.

20. The system according to claim 17, wherein high-priority cyclical system tasks are executed without being influenced by the at least one error reaction function.

21. The system according to claim 11, wherein tasks that comprise an error are aborted, whereby reliable behavior of the automation system is ensured.

22. The system according to claim 16, wherein aborted non-cyclical tasks are restarted, taking a respectively preceding terminated non-cyclical task as a basis.

23. The system according to claim 16, wherein in the event of an occurrence of errors in cyclical tasks, the automation system is stopped.

24. The system according to claim 11, wherein in the event of an occurrence of errors due to the automation system, a consistent system behavior is produced without stopping the automation system.

* * * * *